3,007,941
DECARBONYLATION OF FURFURAL
Harry B. Copelin and Donald I. Garnett, Niagara Falls, N.Y., assignors to E. I. du Pont de Nemours and Company, Wilmington, Del., a corporation of Delaware
No Drawing. Filed Dec. 31, 1959, Ser. No. 863,089
9 Claims. (Cl. 260—346.1)

This invention relates to the preparation of furan from furfural and more particularly to the manufacture of furan by the catalytic decarbonylation of furfural.

The prior art discloses numerous methods for the catalytic conversion of furfural to furan by passing furfural vapor, generally in admixture with steam over a heated catalyst. Cass et al., U.S. Patent 2,337,027 (December 21, 1943), describes a process in which furfural vapors are passed over calcium oxide or hydroxide at a temperature in the range 350 to 550° C. Tyran, U.S. Patent 2,776,981 (January 8, 1957) also describes a process of this type yielding maximum conversions of around 93% in which a gaseous mixture of furfural and steam is heated in the range 300° to 450° C. in the presence of an activated chromite catalyst.

In 1952, H. E. Eschinazi (Bulletin de la Societe Chemique, 5th Series, vol. 19, pages 967–969) described a process for the liquid phase decarbonylation of furfural by boiling liquid furfural in the presence of a palladium catalyst on a barium sulfate support.

Research studies have confirmed the findings reported by Eschinazi. However, it has also been found that palladium catalysts when used alone in the manner described have a relatively low degree of activity and soon become substantially inactive. As a result, production of furan per gram palladium in the catalyst is low. In the experiment reported by Eschinazi, 40 cc. of approximately 36 g. of furan were produced in 5 hours using 150 mg. palladium. Accordingly, the average catalytic activity, as indicated by the production rate, was 48 g. furan per gram palladium per hour.

It is an object of this invention to provide an improved process for the decarbonylation of furfural to furan. Another object is to provide an improved process for the liquid phase decarbonylation of furfural employing a palladium catalyst under such conditions that the catalyst has an improved reactivity and a long life. These and further objects will be apparent from the following description of the invention.

The above objects are obtained in accordance with this invention by contacting furfural with a basic salt of an alkali metal and also contacting said furfural with a basic salt of an alkali metal and also contacting said furfural with a palladium catalyst at an elevated temperature, preferably of at least 162° C. The process may be carried out by heating furfural with a palladium catalyst in the presence of a basic salt of an alkali metal, preferably sodium or potassium carbonate. Other suitable salts include disodium phosphate, sodium phthalate, sodium tetraborate and lithium carbonate. Basic salts of alkaline earth metals have some utility but are much less effective. Strong alkalis are ineffective because they are consumed by reaction with furfural and this also accelerates formation of tars and other undesirable by-products. For the purposes of this invention basic salts may be defined as those which produce a pH of not less than 8 in aqueous solution. However, salts of acids which are known poisons for the catalytic metals of group VIII of the periodic table are definitely harmful. Rhodium, ruthenium, and the platinum metals show slight activity as compared with palladium in the process of this invention whereas nickel is substantially inactive.

This invention makes it possible to produce furan by direct distillation from boiling furfural in the presence of a palladium catalyst by employing a fractionating column which will act as a reflux condenser for furfural (B.P. 162° C.) while allowing the low boiling furan (B.P. 32° C.) and by-product carbon monoxide to distill as an overhead product while returning the unreacted furfural to the reaction mixture.

The process of this invention represents an outstanding improvement over the prior art in that the presence of the aforesaid basic salts of the alkali metals results in a striking increase in the activity and working life of the palladium catalyst. In view of the high cost of palladium, an active highly productive catalyst is essential to commercial success. In the absence of the basic salt additives, a palladium catalyst becomes substantially inert after production of about 5000 g. furan per g. palladium whereas yields of about 10,000 g. to around 30,000 g. furan per g. palladium and above can be obtained in the presence of a basic salt, such as sodium carbonate. Although numerous factors, such as furfural purity, reaction temperature, presence of inert solvents, variations in catalyst preparation, nature of catalyst support, etc. contribute to the success of the process, the presence of the basic salt additives lead to improved catalyst life and activity under all operating conditions.

The process of this invention is preferably carried out by feeding furfural to a reactor in which it is kept at a vigorous boil while being agitated with the palladium catalyst and the basic salt additive. Catalyst and basic salt are normally in granular or powder form so that they can be kept suspended in the furfural medium. Furfural and furan vapors leaving the reactor enter a distilling column which allows the furan to pass over to a condenser whereas unconverted furfural is condensed so that it may be returned to the reactor together with additional furfural to maintain a constant level of liquid in the reactor. A vigorous boil-up with a correspondingly high furfural reflux is essential for insuring a high rate of furan production. Additional basic salt is added from time to time as the rate of furan production drops off due to the gradual loss of catalyst activity or catalyst decay. The need for the addition of basic salt to the reaction mixture is apparent whenever an aqueous extract of a sample of the mixture is found to have a pH below 8. This addition is continued until the catalyst becomes substantially inactive and is no longer responsive to basic salt addition. The process may be made continuous by adding fresh catalyst as well as additional basic salt and removing portions of the reaction mixture for recovery of catalyst. Solids including spent catalyst can be removed by filtration and the liquid filtrate can then be purified and returned with the furfural feed. The process is preferably carried out in the substantial absence of water. To accomplish this, catalyst, furfural and basic salt should be introduced in a substantially dry state.

A supported palladium catalyst containing about 1 to 20%, preferably 5 to 10%, palladium by weight gives best results. Suitable supports include carbon, alumina, barium sulfate, diatomaceous earth and silica gel. Calcium carbonate, which as previously pointed out is a mildly effective basic salt additive may itself be used as a catalyst support. In general, any of the art recognized catalyst supports may be used. Obviously, however, acidic supports or supports that are corroded by exposure to alkali are undesirable. In general, catalysts prepared by a technique involving the precipitation of palladium on the support in the form of compounds, such as palladium oxide or hydroxide, by addition of sodium carbonate to an aqueous palladium salt give good results. Supported palladium catalysts can be improved in some instances by boiling with aqueous solutions of basic salts of alkali metals, preferably sodium carbonate before use.

Palladium hydroxide or oxide precipitated on a catalyst support is rapidly converted to palladium metal by reduction with furfural on use. These compounds may also be separately reduced to palladium before use by any of the well-known procedures employed for this purpose.

In general, the supported catalyst should be added to the reaction mixture in an amount equivalent to from about 0.1 to 10% of the weight of liquor in the reactor. The weight ratio of supported catalyst to that of the basic salt should preferably be in the range 1:1 to 1:20, most preferably 1:2 to 1:10.

The rate at which the decarbonylation takes place in the reactor or rate of furan production increases with increase of temperature as would be expected. However, as previously pointed, vigorous boiling or a high boil-up ratio is also essential to obtaining a high degree of productivity. The boil-up ratio is the ratio of the partial pressure of furfural to the partial pressure of furan leaving the reactor. This is substantially equivalent to the ratio of moles of furfural returned to the reactor in the column reflux to the moles of furan produced. A high boil-up ratio, preferably about 5:1 or better is most desirable. The reaction may be carried out at atmospheric or reduced pressures but proceeds more rapidly at the higher pressures, boil-up ratio remaining constant, since under the latter conditions higher temperatures can be maintained. In general, practical reaction rates can be best secured at temperatures above the boiling point of furfural, viz. approximately 163° C. In general, the preferred temperatures are in the range 200° to 230° C. with pressures in the order of 50 to 100 p.s.i.g. (lbs. per square inch gauge pressure). Higher pressures, up to at least 1800 p.s.i.g. appear to be satisfactory on the basis of experimental tests. However, since the cost of pressure equipment increases rapidly with increased pressure, conditions which involve pressures of not more than 100 p.s.i.g. are most practical. For a given temperature, the most favorable boil-up ratios are obtained at the lower pressures. High temperatures may be obtained at atmospheric pressure by employing a high boiling inert solvent medium for the decarbonylation reaction.

Improved productivity and catalyst life are obtained when pure furfural is used in the decarbonylation process of this invention. A good grade of furfural is obtained by fractional distillation or by preliminary treatment of the crude product with an alkali carbonate or both. Dry furfural may be used alone, or as previously pointed out, in conjunction with a high-boiling inert solvent. For the purposes of this invention, an inert solvent is one that is substantially neutral in reaction, will not react chemically with furfural and is stable at the boiling point. Preferably, the solvent should be completely miscible and compatible with furfural. The solvent may have a boiling point below the boiling point of furfural but is preferably one with a higher boiling point since this makes it possible to carry out the decarbonylation at a temperature above the boiling point of furfural without the use of pressure as previously noted. Dimethyl- and dibutyl-phthalate esters are examples of suitable solvents for this purpose.

Although the process of this invention is principally directed to the decarbonylation of furfural, it is equally effective in the case of simple derivatives thereof such as methyl furfural (2,5) which yields 2-methyl furan on decarbonylation.

The liquid phase furfural decarbonylation process of this invention has a number of advantages over previous prior art furan processes. Furan yields are substantially quantitative and thus superior to the vapor phase procedures. No steam or water is required and as a result the by-product carbon monoxide is substantially pure and may be used directly as a raw material for other chemical processes. A liquid phase process also has the advantage of giving better space-time-yield than a vapor phase procedure. As already pointed out the process is an improvement over the previously reported liquid phase decarbonylation process in that the palladium catalyst has an improved activity and life. Recovery and regeneration of catalyst is expensive and excessive rehandling results in excessive palladium losses.

The following examples further illustrate the invention.

EXAMPLE 1

A one-liter round bottom reaction flask was charged with 400 ml. dibutyl phthalate, 50 ml. furfural, 10 g. sodium carbonate and 1.0 g. of a supported palladium catalyst consisting of 10% by weight of palladium on barium sulfate. The flask was equipped with a mechanical agitator, a temperature recording device, an automatic feed valve and a surmounting column and condenser for returning unreacted furfural and phthalate solvent medium to the reactor. The flask was heated and the reaction mixture stirred and brought to a vigorous boil at 200° C. Further additions of furfural were made automatically when the temperature exceeded 200° C. due to the increase in concentration of dibutyl phthalate with loss of furfural. In the course of 32 hours, product off-gases consisting of carbon monoxide and 442.9 g. furan were produced. This is equivalent to 4429 g. furan per g. palladium. These figures indicate an average production rate of 139 g. furan per g. palladium per hour which is also a measure of catalyst activity.

A similar reaction identical to the above, except for the fact that no sodium carbonate was included in the charge yielded only 180.0 g. furan or 1800 g. furan per g. palladium in 32 hours. The average production rate or comparative catalyst activity indicated by this figure is accordingly 56 g. furan per g. palladium per hour.

Production rate studies in catalystic furfural decarbonylation tests show that the rate of furan production falls off at a substantially constant rate after approximately 20 hours. From this rate decrease figure, which may be defined as the catalyst decay for the case involved, it is possible to estimate total furan production per g. palladium by extrapolation to infinite time. The resultant figure, defined as extrapolated catalyst productivity, may be employed for comparing catalyst productivity in the various experimental examples.

Extrapolated catalyst productivity figures for the two expeirments of Example 1 come to approximately 20,000 g. furan per g. palladium when the barium sulfate supported palladium was used in the presence of the sodium carbonate additive and about 2000 g. when no sodium carbonate was employed.

EXAMPLE 2

Experiments similar to those described in Example 1 were carried out using 1 g. of a catalyst consisting of 10% by weight palladium supported on a finely divided mixture of gamma and alpha alumina having a surface area of approximately 100 square meters per gram. One experiment was carried out in the absence of an alkaline salt additive. In the second experiment 5 g. of sodium bicarbonate were added to the charge followed by further 1 g. sodium bicarbonate additions whenever catalyst activity fell to one half its initial value. An extrapolated productivity of 1700 g. furan per gram palladium was obtained in the absence of carbonate additive whereas a productivity of 11,000 g. was obtained in the test employing sodium bicarbonate additive.

EXAMPLE 3

An experiment similar to those described in Example 1 was carried out in which the reaction flask was charged with 400 ml. of dibutyl phthalate, 1.0 g. of a carbon supported palladium catalyst containing 10% by weight of palladium and 10 g. sodium carbonate. The decarbonylation was carried out at 200° C. for a period of 120 hours, and yielded 1234.4 g. furan or 12,344 g. furan per g. palladium. The extrapolated catalyst productivity was estimated as approximately 21,000 g. furan per g. catalyst. The initial catalyst activity was 375 g. furan per g. palladium per hour and the activity at the end of the 120-hour period was 45 g. furan per g. palladium per hour.

EXAMPLE 4

A charge of 1800 ml. furfural, 32 g. of alumina supported palladium catalyst of the type employed in Example 2 containing 10% palladium by weight and 32 g. sodium carbonate was placed in a one-gallon cylindrical steel reactor equipped with a paddle agitator surmounted by a distilling column to return unreacted furfural. The reactor was then heated under 75 pounds per square inch gauge pressure to insure rapid boiling at a temperature of 215–218° C. Furfural was added to maintain the level in the reactor as furan and carbon monoxide were produced. After 22 hours, an additional 20 g. of sodium carbonate were added to the reaction mixture and the process was continued for a total of 35 hours. In this period, 33,000 g. of furan were produced indicating a productivity rate of 295 g. furan/g. palladium per hour. The extrapolated catalyst activity for this run was estimated at 27,300 g. furan per g. palladium.

EXAMPLE 5

A series of experiments similar to Example 4 were carried out in the same steel reactor using 1800 ml. furfural, 30 g. sodium carbonate and 15 g. of the alumina supported catalyst contained 10% palladium by weight. In these experiments, the relation of boil-up ratio to production rate were studied under substantially identical conditions at a reactor temperature of 210° C. The following table summarizes these dates.

Table I

COMPARISON OF FURAN PRODUCTION AT VARYING BOIL-UP RATIOS FOR FURFURAL DECARBONYLATION AT 210° C.

| Boil-Up Ratio | g. Furan/g. Pd./Hr. | Pressure (p.s.i.g.) |
|---|---|---|
| 5.9 | 160 | 50 |
| 2.3 | 105 | 75 |
| 1.4 | 65 | 100 |

As will be noted, under similar conditions of temperature and catalysis, the furan production rate increases rapidly with increasing boil-up ratios.

EXAMPLE 6

Experiments similar to those of Example 2 were carried out with two 500 ml. flask reactors charged with 250 ml. of dibutyl phthalate, 10 ml. furfural and 1 g. of the alumina supported palladium catalyst containing 10% palladium by weight. To one flask was added 2 g. potassium carbonate whereas to the other was added 0.75 g. lithium carbonate. The run with potassium carbonated gave an extrapolated catalyst productivity figure of 28,500 g. furan per g. palladium whereas the lithium carbonate run gave an extrapolated catalyst productivity figure of 5600 g. furan per g. palladium.

EXAMPLE 7

A reaction mixture consisting of 100 g. furfural, 400 g. dibutyl phthalate and 20 g. of a carbon supported palladium catalyst containing 5% palladium by weight was boiled with agitation in a flask surmounted by a column provided with cooling so that the furfural was returned to the reactor as the furan distilled. Additional furfural was added to the reactor as required. The catalyst showed an initial activity equivalent to the production of 125 g. furan per g. palladium per hour which fell off rapidly to a value of 60 g. furan per g. palladium per hour. Following an attempt to reactivate the catalyst by boiling with aqueous sodium hydroxide and treatment with hydrogen, productivity fell to 27 g. furan per g. palladium per hour. After this, 15 g. of calcium carbonate was added to the reaction mixture and productivity rose to 50 g. furan per g. palladium per hour indicating a definite increase in catalyst activity.

The embodiments of the invention in which an exclusive property or privilege is claimed are defined as follows:

1. The process for the production of furan from furfural comprising heating a liquid phase consisting essentially of furfural in the presence of palladium metal and a basic salt of an alkali metal.

2. The process of claim 1 in which the basic salt is sodium carbonate.

3. The process of claim 1 in which the basic salt is potassium carbonate.

4. The process for the production of furan comprising heating a liquid phase consisting essentially of furfural to a vigorous boil and distilling furan therefrom in the presence of a catalyst consisting essentially of palladium metal and a basic salt of an alkali metal.

5. The process for the production of furan comprising heating a liquid phase consisting essentially of furfural to a vigorous boil and distilling furan therefrom at a temperature of in the range 162° to 230° C. in the presence of 0.1 to 10% of a supported palladium catalyst consisting essentially of 1 to 20% palladium by weight on a support selected from the group consisting of carbon, alumina, barium sulfate, diatomaceous earth, silica gel and calcium carbonate and a basic salt of an alkali metal, said process being carried out in such a manner that the ratio of the partial pressure of furfural to furan in the vapors leaving the aforesaid liquid phase is at least 5:1.

6. The process for the production of furan comprising heating a liquid phase consisting essentially of furfural and containing in addition thereto an inert furfural-compatible solvent having a higher boiling point than furfural and distilling furan therefrom in the presence of a catalyst consisting essentially of palladium metal and a basic salt of an alkali metal.

7. The process for the continuous production of furan comprising fractionally distilling furan as formed from a vigorously boiling liquid phase consisting essentially of furfural at a temperature in the range 162° to 230° C. in the presence of about 0.1 to 10% of a supported palladium catalyst consisting essentially of 1 to 20% palladium by weight on a support selected from the group consisting of carbon, alumina, barium sulfate, diatomaceous earth, silica gel and calcium carbonate and a basic salt of an alkali metal while adding additional furfural, additional supported palladium catalyst and additional basic salt of an alkali metal to maintain a good rate of furan production and removing portions of the reaction mixture for recovery of spent catalyst and furfural.

8. The process of claim 7 in which the basic alkali metal salt is sodium carbonate and the fractional distillation of furan is carried out in such a manner that the ratio of the partial pressure of furfural to the partial pressure of furan leaving the liquid phase is at least 5:1.

9. The process of claim 8 in which the basic alkali metal salt is potassium carbonate.

References Cited in the file of this patent

UNITED STATES PATENTS 2,776,981     Tyran _____ Jan. 8, 1957

OTHER REFERENCES

Eschinazi: Bull. Soc. Chim. (France), vol. 19 (1952), pp. 967–9.